(12) United States Patent
Han

(10) Patent No.: US 12,017,503 B2
(45) Date of Patent: Jun. 25, 2024

(54) PLATE ARRANGEMENT FOR FLUID FLOW

(71) Applicants: HYUNDAI MOTOR COMPANY, Seoul (KR); KIA CORPORATION, Seoul (KR)

(72) Inventor: Jong Wan Han, Suwon-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 26 days.

(21) Appl. No.: 17/745,377

(22) Filed: May 16, 2022

(65) Prior Publication Data

US 2023/0092471 A1   Mar. 23, 2023

(30) Foreign Application Priority Data

Sep. 17, 2021  (KR) ........................ 10-2021-0125245

(51) Int. Cl.
*B60H 1/00*   (2006.01)
*F01P 7/14*   (2006.01)

(52) U.S. Cl.
CPC ............... B60H 1/00521 (2013.01); *B60H 2001/00107* (2013.01); *B60H 2001/00307* (2013.01); *F01P 2007/146* (2013.01)

(58) Field of Classification Search
CPC ....... B60H 1/00521; B60H 2001/00307; F01P 2007/146; F24D 3/12; F24D 3/14; F24D 3/141; F24D 3/148; F24D 3/146; F24D 13/024; F24D 19/1015
See application file for complete search history.

(56) References Cited

U.S. PATENT DOCUMENTS

| | | | | |
|---|---|---|---|---|
| 3,143,637 | A * | 8/1964 | Turner | F24D 13/024 392/435 |
| 4,069,973 | A * | 1/1978 | Edwards | F24D 3/14 165/56 |
| 6,152,377 | A * | 11/2000 | Fiedrich | F24D 3/14 165/49 |
| 6,640,835 | B1 * | 11/2003 | Rohrberg | F16K 27/003 285/125.1 |

(Continued)

FOREIGN PATENT DOCUMENTS

| | | | | |
|---|---|---|---|---|
| CN | 1816671 | A * | 8/2006 | ............. F24D 3/142 |
| CN | 112389155 | A * | 2/2021 | ......... B60H 1/00007 |

(Continued)

OTHER PUBLICATIONS

JP-2005221192-A English machine translation (Year: 2005).*
FR3096445A1 English Machine Translation (Year: 2020).*

*Primary Examiner* — Jenna M Maroney
(74) *Attorney, Agent, or Firm* — MCDONNELL BOEHNEN HULBERT & BERGHOFF LLP

(57) ABSTRACT

A plate arrangement for fluid flow includes a support plate, and a plurality of channel plates detachably mounted on the support plate, wherein the plurality of channel plates are mounted to cover at least a portion of the support plate, each channel plate has a fluid channel, the plurality of channel plates are arranged along a fluid flow path of at least a portion of a predetermined fluid circulation loop so that the plurality of channel plates form at least the portion of the fluid circulation loop, and fluid channels of adjacent channel plates are fluidly connected to each other.

9 Claims, 17 Drawing Sheets

(56) References Cited

U.S. PATENT DOCUMENTS

| | | | |
|---|---|---|---|
| 10,358,778 B2 * | 7/2019 | Theodore, Jr. | E01C 11/265 |
| 11,192,425 B2 * | 12/2021 | Oh | B60H 1/00899 |
| 2008/0017725 A1 * | 1/2008 | Backman, Jr. | F24D 3/142 |
| | | | 165/56 |
| 2014/0069605 A1 * | 3/2014 | Sullivan | B21D 47/00 |
| | | | 165/56 |
| 2016/0375740 A1 * | 12/2016 | Duerr | F28F 3/08 |
| | | | 62/506 |

FOREIGN PATENT DOCUMENTS

| | | | | |
|---|---|---|---|---|
| EP | 3112549 A1 * | 1/2017 | | E04B 5/48 |
| EP | 4086563 A1 * | 11/2022 | | B60H 1/00028 |
| FR | 3096445 A1 * | 11/2020 | | F24D 3/125 |
| JP | 2004333020 A * | 11/2004 | | |
| JP | 2005221192 A * | 8/2005 | | |
| KR | 10-2140658 B1 | 8/2020 | | |
| WO | WO-2006095685 A1 * | 9/2006 | | E04F 15/18 |
| WO | WO-2013081434 A1 * | 6/2013 | | E04F 15/181 |

* cited by examiner

PLATE ARRANGEMENT FOR FLUID FLOW

CROSS REFERENCE TO RELATED APPLICATIONS

This application is based on and claims the benefit of priority to Korean Patent Application No. 10-2021-0125245, filed on Sep. 17, 2021, in the Korean Intellectual Property Office, the disclosure of which is incorporated herein in its entirety by reference.

TECHNICAL FIELD

The present disclosure relates to a plate arrangement for fluid flow, and more particularly, to a plate arrangement for fluid flow designed to flatten at least a portion of a circulation loop through which a fluid flows.

BACKGROUND

A cooling system for a vehicle may be configured to allow a coolant to circulate so as to cool heat generating components such as an internal combustion engine, batteries, and power electronics. The vehicle cooling system may include a coolant circulation loop through which the coolant circulates, and the coolant circulation loop may be fluidly connected to various components including control components (valves, pumps, etc.) for controlling the flow of the coolant, heat exchangers (a radiator, etc.), and heat generating components (an internal combustion engine, batteries, power electronics, etc.).

For example, the vehicle cooling system may include an internal combustion engine cooling system allowing the coolant to circulate so as to cool an internal combustion engine of an internal combustion engine vehicle, a battery cooling system allowing the coolant to circulate so as to cool a battery of an electric vehicle, a power electronics cooling system allowing the coolant to circulate so as to cool power electronics of a powertrain of an electric vehicle, and a battery-power electronics cooling system allowing the coolant to circulate so as to cool both the battery and the power electronics of an electric vehicle.

The vehicle cooling system may be mounted in a narrow front compartment of the vehicle, and a plurality of tubes or a plurality of hoses may form the coolant circulation loop of the vehicle cooling system. The dimensions (diameters, lengths, etc.) of the tubes or the dimensions (diameters, lengths, etc.) of the hoses may vary according to the positions and arrangement of various components. The plurality of tubes or a plurality of hoses for forming the coolant circulation loop may make the layout of the vehicle cooling system complicated in the front compartment of the vehicle.

The layout of the vehicle cooling system may at least partially change depending on types or structures of vehicles. Accordingly, it may be difficult to modularize or standardize the vehicle cooling system. Thus, the vehicle cooling system may be difficult to flexibly respond to the automated production of vehicles.

The above information described in this background section is provided to assist in understanding the background of the inventive concept, and may include any technical concept which is not considered as the prior art that is already known to those skilled in the art.

SUMMARY

The present disclosure has been made to solve the above-mentioned problems occurring in the prior art while advantages achieved by the prior art are maintained intact.

An aspect of the present disclosure provides a plate arrangement for fluid flow designed to flatten at least a portion of a fluid circulation loop through which a fluid such as a coolant flows, thereby easily achieving modularization or standardization of at least a portion of the fluid circulation loop and/or a plurality of components fluidly connected thereto.

According to an aspect of the present disclosure, a plate arrangement for fluid flow may include a support plate, and a plurality of channel plates detachably mounted on the support plate. The plurality of channel plates may be mounted to cover at least a portion of the support plate, each channel plate may have a fluid channel, the plurality of channel plates may be arranged along a fluid flow path of at least a portion of a predetermined fluid circulation loop so that the plurality of channel plates may form at least the portion of the fluid circulation loop, and fluid channels of adjacent channel plates may be fluidly connected to each other.

The support plate and the plurality of channel plates in the plate arrangement for fluid flow may allow at least the portion of the fluid circulation loop to be flattened, thereby easily achieving the modularization or standardization of at least the portion of the fluid circulation loop and/or the plurality of components fluidly connected thereto. Thus, the layout of various fluid flow systems may become compact and simplified, and may flexibly respond to the automated production of vehicles, thereby reducing the manufacturing costs of vehicles.

The plate arrangement may further include a plurality of dummy plates disposed between at least some adjacent channel plates of the plurality of channel plates, and each dummy plate may have no fluid channel.

As the plurality of dummy plates having no fluid channel are disposed between the plurality of channel plates, the plurality of channel plates and the plurality of dummy plates may be mounted on the support plate, and thus the overall flattening and structural stiffness of the plates in the plate arrangement may be reliably achieved.

The plurality of dummy plates may be detachably mounted on the support plate.

As the plurality of dummy plates are mounted on the support plate, the plurality of channel plates mounted on the support plate may be stably supported.

The channel plate may have a first surface facing the support plate and a second surface opposing the first surface. The fluid channel may be recessed from the first surface of the channel plate toward the second surface of the channel plate.

As the fluid channel is recessed in each channel plate, the fluid channel of the channel plate may be precisely and easily processed by a relatively inexpensive manufacturing method.

The dummy plate may have a first surface facing the support plate and a second surface opposing the first surface. The first surface of the channel plate may be flush with the first surface of the dummy plate, and the second surface of the channel plate may be flush with the second surface of the dummy plate.

As the dummy plates are aligned with the channel plates, the flattening of the plates with respect to at least the portion of the fluid circulation loop may be reliably achieved.

The support plate may have a plurality of holes, and the plurality of holes may be arranged in a predetermined pattern. The channel plate may have a plurality of recesses, the plurality of recesses may be arranged in a predetermined pattern, and the plurality of recesses may be aligned with at least some of the plurality of holes.

As a bolt is fastened to any one hole of the support plate and a corresponding recess of the channel plate, each channel plate may be firmly fixed to the support plate.

The dummy plate may have a plurality of recesses, the plurality of recesses may be arranged in a predetermined pattern, and the plurality of recesses may be aligned with at least some of the plurality of holes.

As a bolt is fastened to any one hole of the support plate and a corresponding recess of the dummy plate, each dummy plate may be firmly fixed to the support plate.

The plurality of channel plates may have the same external shape and the same external size.

Accordingly, the plurality of channel plates may be variously combined on the support plate to match fluid flow paths of various fluid circulation loops.

The plurality of dummy plates may have the same external shape and the same external size, and each dummy plate and each channel plate may have the same external shape and the same external size.

Accordingly, the plurality of channel plates and the plurality of dummy plates may be variously combined on the support plate to match fluid flow paths of various fluid circulation loops.

The support plate may include a first mounting surface on which the plurality of channel plates and the plurality of dummy plates are mounted, and a second mounting surface opposing the first mounting surface. The first mounting surface may be a flat surface corresponding to the first surface of each channel plate.

As the plurality of channel plates and the plurality of dummy plates are mounted on the first mounting surface of the support plate, the fluid flow system may be efficiently flattened and become compact.

The plate arrangement may further include a plurality of components fluidly connected to the fluid channels of the corresponding channel plates through the support plate.

As the plurality of components are fluidly connected to the fluid channels of the corresponding channel plates through the support plate, at least the portion of the fluid circulation loop and the related components may become more compact.

The plurality of components may include: at least one control component controlling the flow of a coolant, at least one heat exchanger cooling the coolant by an external heat transfer medium, and at least one heat generating component having an internal passage through which the coolant passes.

BRIEF DESCRIPTION OF THE FIGURES

The above and other objects, features and advantages of the present disclosure will be more apparent from the following detailed description taken in conjunction with the accompanying drawings.

DETAILED DESCRIPTION

Figure 1:
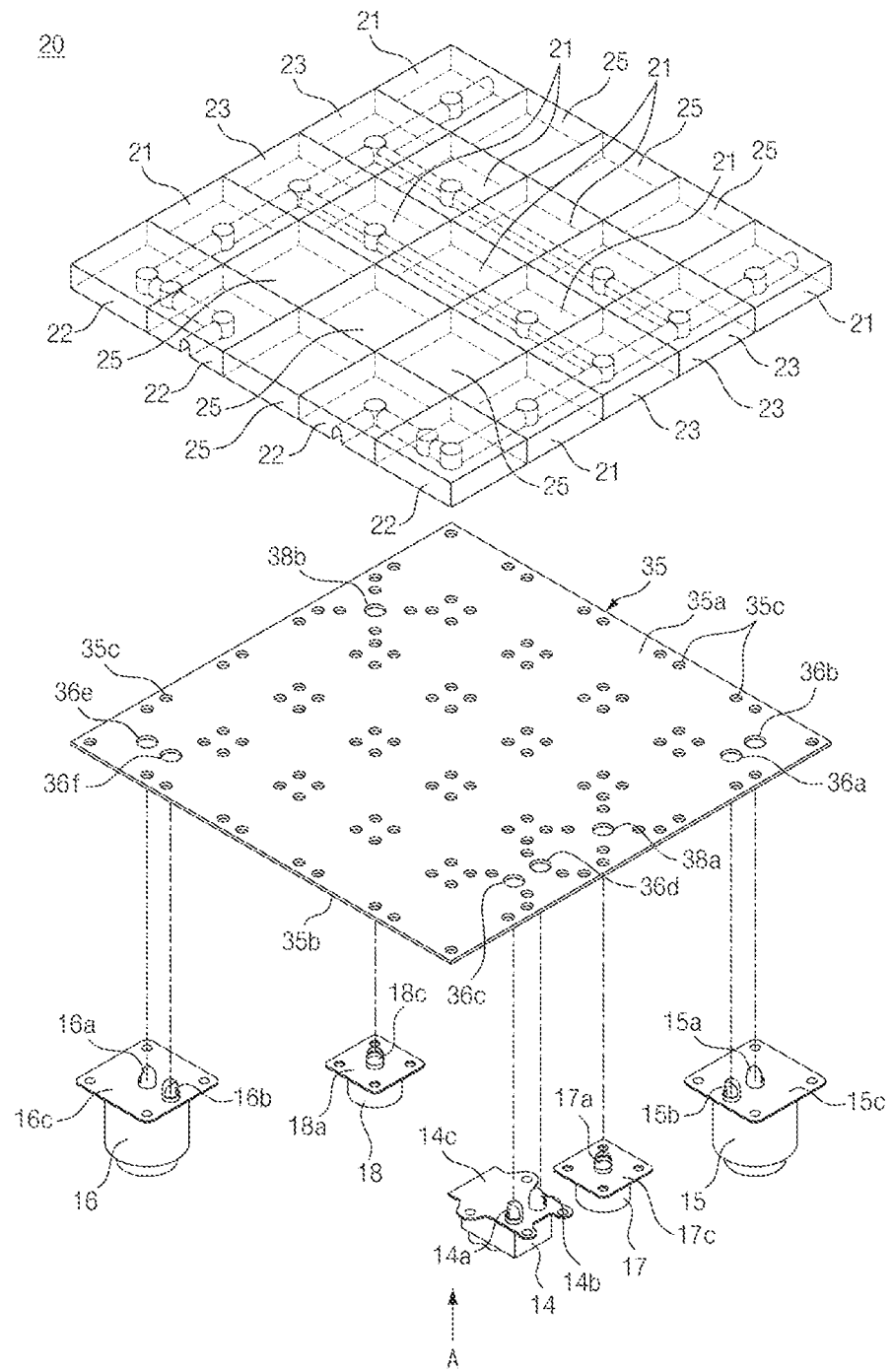
FIG. 1 illustrates an exploded perspective view of a plate arrangement for fluid flow according to an exemplary embodiment of the present disclosure.

Hereinafter, exemplary embodiments of the present disclosure will be described in detail with reference to the accompanying drawings. In the drawings, the same reference numerals will be used throughout to designate the same or equivalent elements. In addition, a detailed description of well-known techniques associated with the present disclosure will be ruled out in order not to unnecessarily obscure the gist of the present disclosure.

Terms such as first, second, A, B, (a), and (b) may be used to describe the elements in exemplary embodiments of the present disclosure. These terms are only used to distinguish one element from another element, and the intrinsic features, sequence or order, and the like of the corresponding elements are not limited by the terms. Unless otherwise defined, all terms used herein, including technical or scientific terms, have the same meanings as those generally understood by those with ordinary knowledge in the field of art to which the present disclosure belongs. Such terms as those defined in a generally used dictionary are to be interpreted as having meanings equal to the contextual meanings in the relevant field of art, and are not to be interpreted as having ideal or excessively formal meanings unless clearly defined as having such in the present application.

Referring to FIG. 1, a plate arrangement 20 for fluid flow according to an exemplary embodiment of the present disclosure may be designed to form at least a portion 6a (see FIG. 8) of a predetermined fluid circulation loop 6 through which a fluid such as a coolant circulates.

Figure 2:
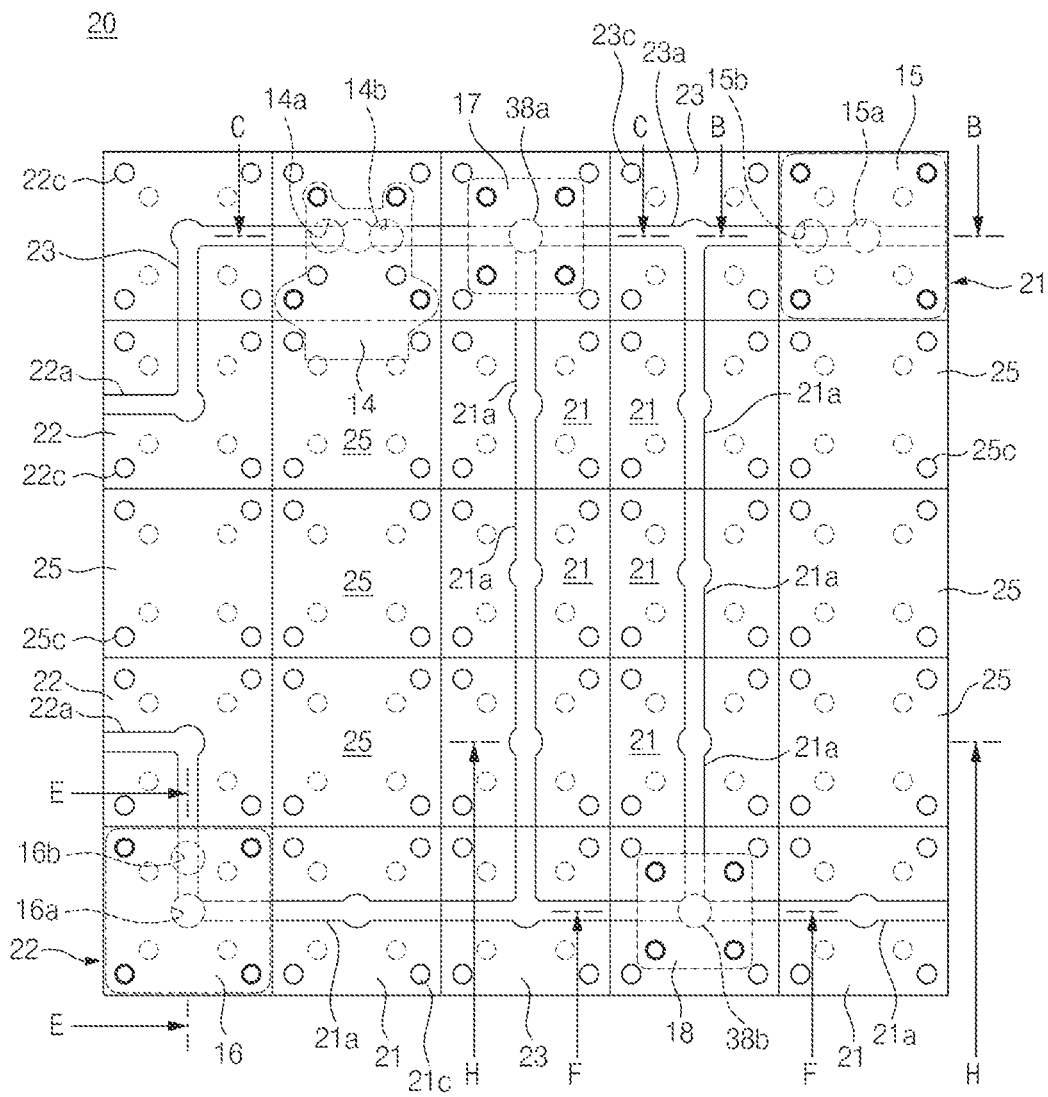
FIG. 2 illustrates a view which is viewed from direction A of FIG. 1.

Referring to FIGS. 1 and 2, the plate arrangement 20 for fluid flow according to an exemplary embodiment of the present disclosure may include a plurality of channel plates 21, 22, and 23 having fluid channels 21a, 22a, and 23a, respectively.

The plurality of channel plates 21, 22, and 23 may include at least one first channel plate 21 having a first fluid channel 21a, at least one second channel plate 22 having a second fluid channel 22a, and at least one third channel plate 23 having a third fluid channel 23a.

According to an exemplary embodiment, the plurality of channel plates 21, 22, and 23 may be attached to each other on the same plane, and the fluid channels 21a, 22a, and 23a of the adjacent channel plates 21, 22, and 23 may be fluidly connected to each other to form at least the portion 6a of the fluid circulation loop 6. At least some edges of each channel plate may directly contact edges of other adjacent channel plates.

According to another exemplary embodiment, the plurality of channel plates 21, 22, and 23 may be connected in a vertically stacked manner.

Figure 3:
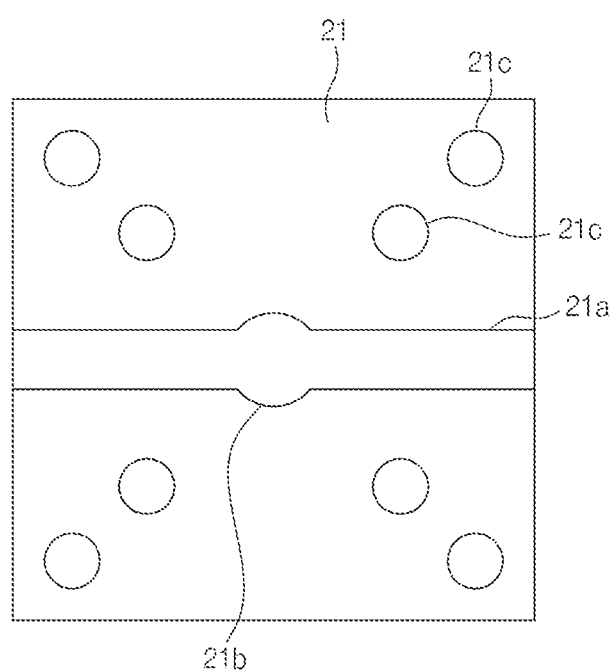
FIG. 3 illustrates a first channel plate in a plate arrangement for fluid flow according to an exemplary embodiment of the present disclosure.

Referring to FIG. 3, the first channel plate 21 may include the first fluid channel 21a defined therein, and the first fluid channel 21a may have a straight shape. A first connection portion 21b may be provided in a central portion of the first fluid channel 21a, and the first connection portion 21b may have various shapes such as a circular shape or a square shape. Various components (not shown) may be fluidly connected to the first connection portion 21b.

Figure 4:
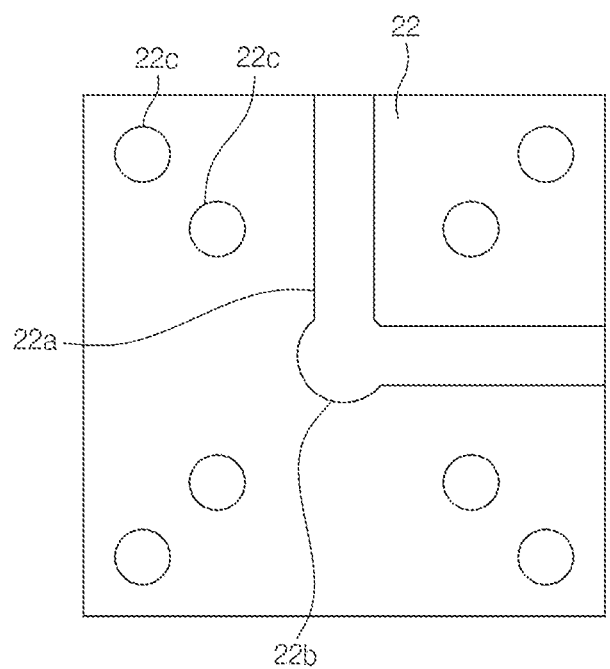
FIG. 4 illustrates a second channel plate in a plate arrangement for fluid flow according to an exemplary embodiment of the present disclosure.

Referring to FIG. 4, the second channel plate 22 may include the second fluid channel 22a defined therein, and the second fluid channel 22a may have an L-shape. A second connection portion 22b may be located at a corner portion of the L-shaped second fluid channel 22a, and the second connection portion 22b may have various shapes such as a circular shape or a square shape. Various components (not shown) may be fluidly connected to the second connection portion 22b.

Figure 5:
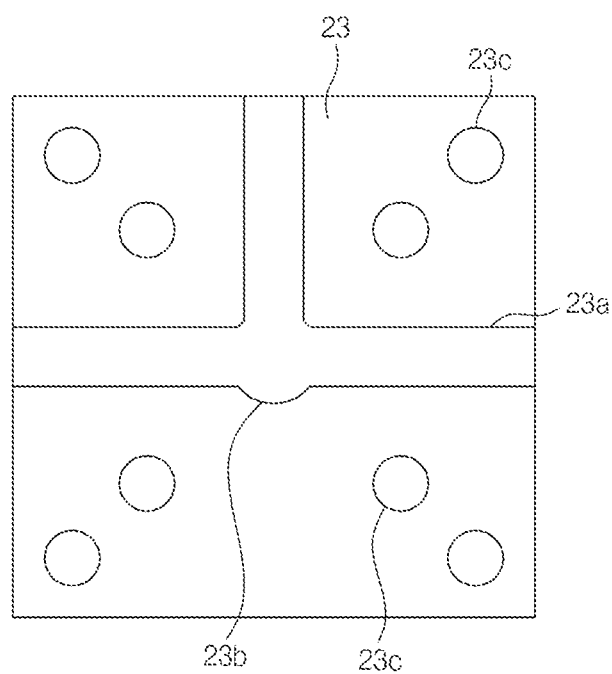
FIG. 5 illustrates a third channel plate in a plate arrangement for fluid flow according to an exemplary embodiment of the present disclosure.

Referring to FIG. 5, the third channel plate 23 may include the third fluid channel 23a defined therein, and the third fluid channel 23a may have a T-shape. A third connection portion 23b may be located at an intersection of the T-shaped third fluid channel 23a. Various components (not shown) may be fluidly connected to the third connection portion 23b.

A support plate 35 may support the plurality of channel plates 21, 22, and 23, and the plurality of channel plates 21, 22, and 23 may be mounted on the support plate 35. In particular, the plurality of channel plates 21, 22, and 23 may be mounted to cover at least a portion of the support plate 35. Each of the channel plates 21, 22, and 23 and the support plate 35 may be a flat plate. Each of the channel plates 21, 22, and 23 may have the form of a cube or a rectangular cuboid, and the size of each of the channel plates 21, 22, and 23 may be less than the size of the support plate 35. In particular, the first channel plate 21, the second channel plate 22, and the third channel plate 23 may have the same thickness.

According to an exemplary embodiment, the plurality of channel plates 21, 22, and 23 may have the same external shape and the same external size. Since the channel plates 21, 22, and 23 have the same external shape and the same external size, the plurality of channel plates 21, 22, and 23 may be variously combined to match fluid circulation loops of various fluid flow systems.

According to another exemplary embodiment, at least some of the plurality of channel plates 21, 22, and 23 may have different external shapes and different external sizes.

Referring to FIGS. 11, 12, 15, and 17, the first channel plate 21 may include a first surface 41 facing the support plate 35, a second surface 42 opposing the first surface 41, and a plurality of side surfaces. The first fluid channel 21a may be recessed from the first surface 41 toward the second surface 42.

Figure 12:
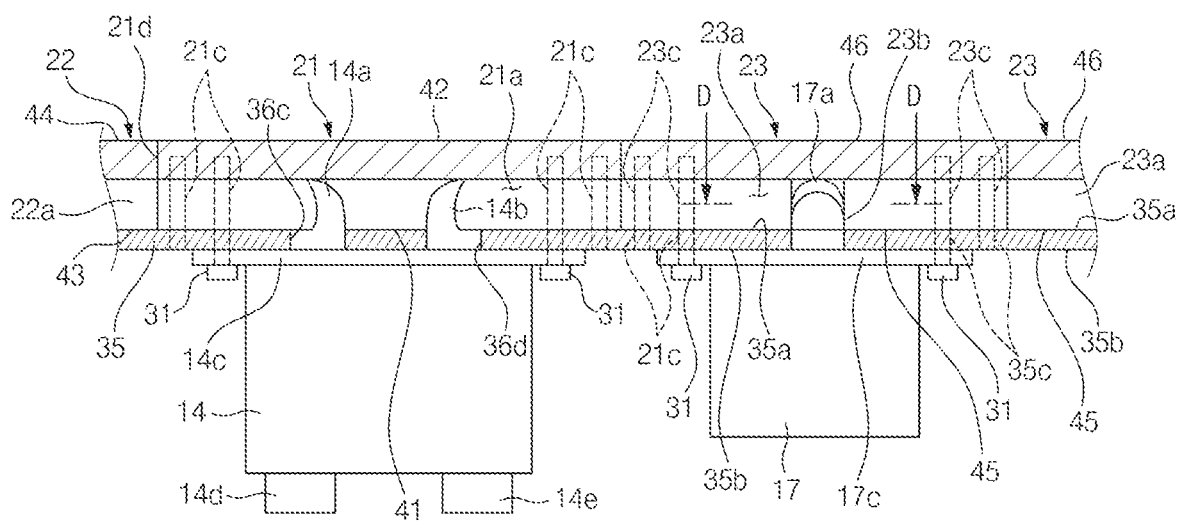
FIG. 12 illustrates a cross-sectional view, taken along line C-C of FIG. 2.
Figure 14:
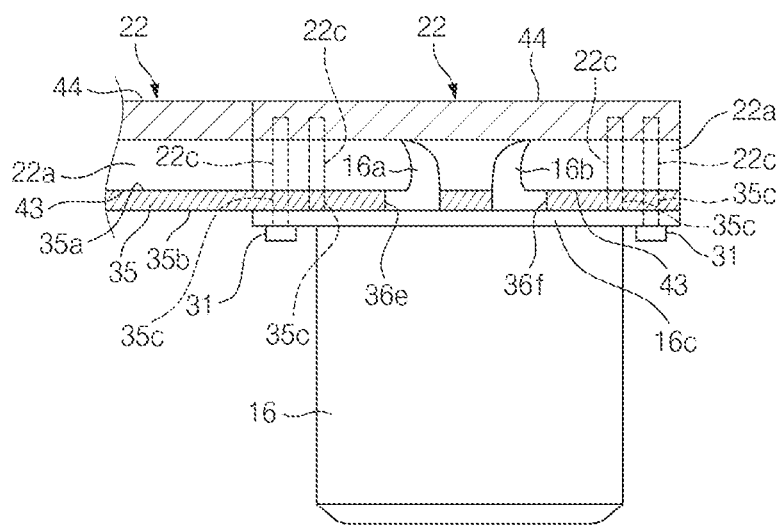
FIG. 14 illustrates a cross-sectional view, taken along line E-E of FIG. 2.

Referring to FIGS. 12 and 14, the second channel plate 22 may include a first surface 43 facing the support plate 35, a second surface 44 opposing the first surface 43, and a plurality of side surfaces. The second fluid channel 22a may be recessed from the first surface 43 toward the second surface 44.

Figure 11:
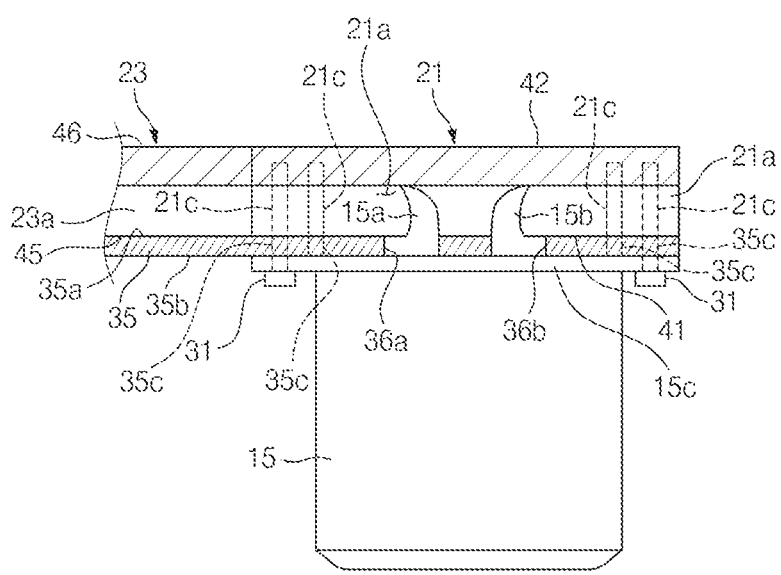
FIG. 11 illustrates a cross-sectional view, taken along line B-B of FIG. 2.
Figure 15:
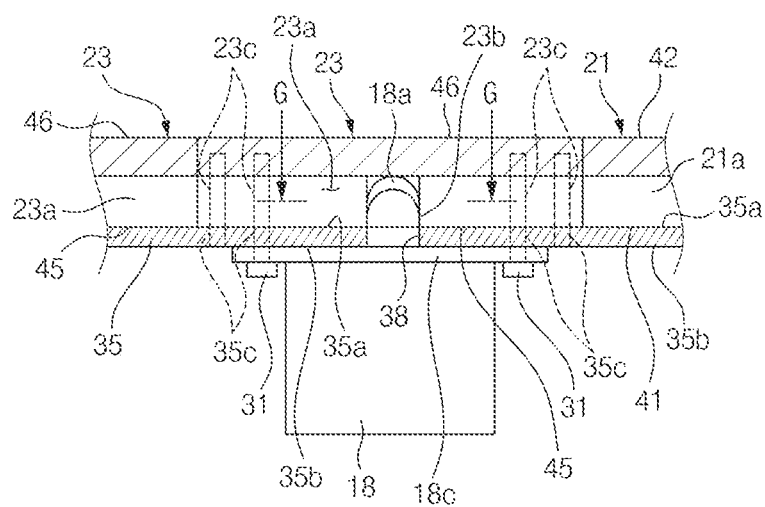
FIG. 15 illustrates a cross-sectional view, taken along line F-F of FIG. 2.

Referring to FIGS. 11, 12, and 15, the third channel plate 23 may include a first surface 45 facing the support plate 35, a second surface 46 opposing the first surface 45, and a plurality of side surfaces. The third fluid channel 23a may be recessed from the first surface 45 toward the second surface 46.

The first surface 41 of the first channel plate 21, the first surface 43 of the second channel plate 22, and the first surface 45 of the third channel plate 23 may be flush with each other. That is, the first surface 41 of the first channel plate 21, the first surface 43 of the second channel plate 22, and the first surface 45 of the third channel plate 23 may form a single flat plane.

The second surface 42 of the first channel plate 21, the second surface 44 of the second channel plate 22, and the second surface 46 of the third channel plate 23 may be flush with each other. That is, the second surface 42 of the first channel plate 21, the second surface 44 of the second channel plate 22, and the second surface 46 of the third channel plate 23 may form a single flat plane.

As the fluid channels 21a, 22a, and 23a are recessed from the first surfaces 41, 43, and 45 of the corresponding channel plates 21, 22, and 23, the fluid channels 21a, 22a, and 23a of the channel plates 21, 22, and 23 may be precisely and easily processed by a relatively inexpensive manufacturing method. Each of the first surfaces 41, 43, and 45, the second surfaces 42, 44, and 46, and the side surfaces of the channel plates 21, 22, and 23 may be flat. The fluid channels 21a, 22a, and 23a of the channel plates 21, 22, and 23 may be connected to each other by sealing members such as O-rings mounted on respective end portions thereof.

Referring to FIG. 1, the support plate 35 may include a first mounting surface 35a on which the plurality of channel plates 21, 22, and 23 are mounted, and a second mounting surface 35b on which components 14, 15, 16, 17, and 18 fluidly connected to at least the portion 6a of the fluid circulation loop 6 are mounted.

Referring to FIGS. 1, 11, 12, 14, 15, and 17, the first mounting surface 35a of the support plate 35 may be a flat surface corresponding to the first surfaces 41, 43, and 45 of the channel plates 21, 22, and 23, and thus the channel plates 21, 22, and 23 may be tightly mounted on the first mounting surface 35a of the support plate 35. The second mounting surface 35b of the support plate 35 may oppose the first mounting surface 35a, and the second mounting surface 35b may be a flat surface corresponding to mounting flanges 14c, 15c, 16c, 17c, and 18c of the components 14, 15, 16, 17, and 18.

The plurality of channel plates 21, 22, and 23 may be mounted to cover at least a portion of the first mounting surface 35a of the support plate 35.

According to an exemplary embodiment, when the channel plates 21, 22, and 23 are mounted on the support plate 35 through fasteners, the first surfaces 41, 43, and 45 of the channel plates 21, 22, and 23 may directly contact the first mounting surface 35a of the support plate 35. According to another exemplary embodiment, a sealing member such as a gasket or a seal may be at least partially interposed between each of the first surfaces 41, 43, and 45 of the channel plates 21, 22, and 23 and the first mounting surface 35a of the support plate 35, and thus the fluid channels 21a, 22a, and 23a of the channel plates 21, 22, and 23 may be mounted on the first mounting surface 35a of the support plate 35 in a sealed manner.

Figure 6:
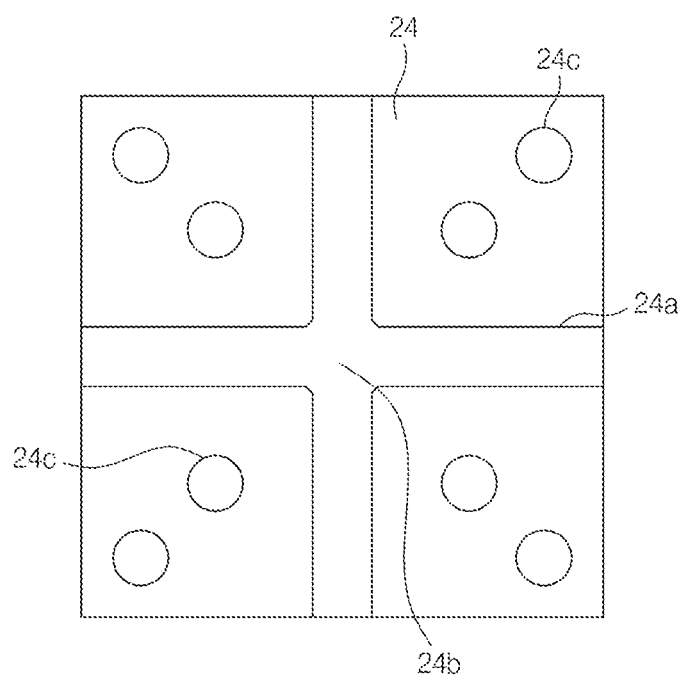
FIG. 6 illustrates a fourth channel plate in a plate arrangement for fluid flow according to an exemplary embodiment of the present disclosure.

The plate arrangement 20 for fluid flow according to an exemplary embodiment of the present disclosure may further include a fourth channel plate 24. Referring to FIG. 6, the fourth channel plate 24 may include a fourth fluid channel 24a defined therein, and the fourth fluid channel 24a may have a cross (+) shape. A fourth connection portion 24b may be provided at an intersection of the cross-shaped fourth fluid channel 24a. Various components (not shown) may be fluidly connected to the fourth connection portion 24b.

As illustrated in FIGS. 3 to 6, the channel plates 21, 22, 23, and 24 may have the fluid channels 21a, 22a, 23a, and 24a of various shapes such as a straight shape (a vertical straight shape, a horizontal straight shape), L-shape, T-shape, or cross (+) shape. In addition, the fluid channel may also have other shapes such as U-shape. Accordingly, the fluid channels 21a, 22a, 23a, and 24a of the channel plates 21, 22, 23, and 24 may be variously formed to match at least the portion 6a of the fluid circulation loop 6.

As described above, the channel plates 21, 22, 23, and 24 may have a simple structure for fluid flow using the fluid channels 21a, 22a, 23a, and 24a and the connection portions 21b, 22b, 23b, and 24b, thereby enabling the standardization of the plate arrangement, and various components may be simply and easily mounted on at least some of the channel plates 21, 22, 23, and 24.

Referring to FIGS. 1 and 2, the plurality of channel plates 21, 22, and 23 may be arranged on the first mounting surface 35a of the support plate 35 along a fluid flow path of at least the portion 6a of the fluid circulation loop 6 so that the plurality of channel plates 21, 22, and 23 may form at least the portion 6a of the fluid circulation loop 6. An empty space on which the channel plates 21, 22, and 23 are not mounted may be created on the first mounting surface 35a of the support plate 35. The plate arrangement 20 according to an exemplary embodiment of the present disclosure may further include a plurality of dummy plates 25 disposed between at least some of the plurality of channel plates 21, 22, and 23, and each dummy plate 25 may not have a fluid channel. Since the plurality of dummy plates 25 have no fluid channel, they may not be related to the fluid circulation loop 6. The plurality of dummy plates 25 may be mounted on the empty space of the first mounting surface 35a of the support plate 35 on which the channel plates 21, 22, and 23 are not mounted, and thus lateral support stiffness with respect to the plurality of channel plates 21, 22, and 23 may be improved, and flattening of the plurality of plates with respect to the first mounting surface 35a of the support plate 35 may be reliably achieved. As the plurality of channel plates 21, 22, and 23 and the plurality of dummy plates 25 are mounted on the first mounting surface 35a of the support plate 35, the plurality of channel plates 21, 22, and 23 and the plurality of dummy plates 25 may entirely or partially cover the first mounting surface 35a of the support plate 35.

Referring to FIGS. 1 and 2, when the plurality of channel plates 21, 22, and 23 and the plurality of dummy plates 25 are mounted on the first mounting surface 35a of the support plate 35, the total area of the first surfaces 41, 43, and 45 of the channel plates 21, 22, and 23 and first surfaces 47 of the dummy plates 25 may be substantially the same as that of the first mounting surface 35a of the support plate 35.

Figure 17:
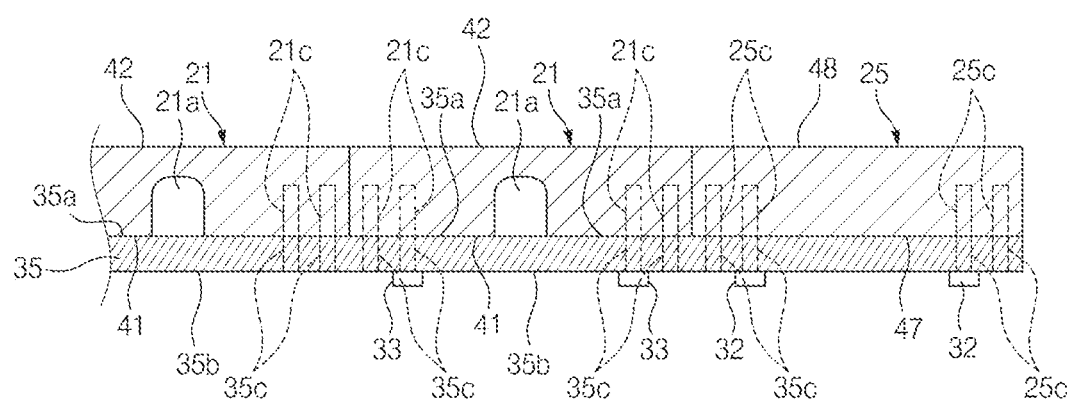
FIG. 17 illustrates a cross-sectional view, taken along line H-H of FIG. 2.

Referring to FIG. 17, each dummy plate 25 may include the first surface 47 facing the support plate 35, a second surface 48 opposing the first surface 47, and a plurality of side surfaces.

A thickness of the dummy plate 25 may be the same as that of each of the channel plates 21, 22, and 23. The first surface 47 of the dummy plate 25 may be aligned with the first surfaces 41, 43, and 45 of the channel plates 21, 22, and 23 so that the first surface 47 of the dummy plate 25 may be flush with the first surfaces 41, 43, and 45 of the channel plates 21, 22, and 23. The second surface 48 of the dummy plate 25 may be aligned with the second surfaces 42, 44, and 46 of the channel plates 21, 22, and 23 so that the second surface 48 of the dummy plate 25 may be flush with the second surfaces 42, 44, and 46 of the channel plates 21, 22, and 23.

According to an exemplary embodiment, the plurality of dummy plates 25 may have the same external shape and the same external size. In particular, the channel plates 21, 22, and 23 and the dummy plates 25 may have the same external shape and the same external size. Accordingly, the plurality of channel plates 21, 22, and 23 and the plurality of dummy plates 25 may be variously combined on the first mounting surface 35a of the support plate 35 to match fluid circulation loops of various fluid flow systems.

According to another exemplary embodiment, the plurality of dummy plates 25 may have different external shapes and different external sizes. The dummy plates 25 may have different external shapes and different external sizes from those of the channel plates 21, 22, and 23. Accordingly, the plurality of channel plates 21, 22, and 23 and the plurality of dummy plates 25 may be more variously combined on the first mounting surface 35a of the support plate 35 to match fluid circulation loops of various fluid flow systems.

Referring to FIG. 1, the support plate 35 may have a plurality of holes 35c, and the plurality of holes 35c may be arranged in a predetermined pattern. Each hole 35c may be a through hole which is made to go completely through the first mounting surface 35a the second mounting surface 35b.

The channel plates 21, 22, and 23 may have a plurality of recesses 21c, 22c, and 23c, and the plurality of recesses 21c, 22c, and 23c may be aligned with at least some of the plurality of holes 35c provided in the support plate 35. Bolts 31 and 33 may be fastened to the holes 35c of the support plate 35 and the corresponding recesses 21c, 22c, and 23c of the channel plates 21, 22, and 23 so that the channel plates 21, 22, and 23 may be fixed to the support plate 35. The recesses 21c, 22c, and 23c of the channel plates 21, 22, and 23 may be arranged in a predetermined pattern by taking the sizes of the components 14, 15, 16, 17, and 18 into consideration. The bolts 31 may be selectively fastened to the plurality of recesses 21c, 22c, and 23c through the holes 35c of the support plate 35 according to the sizes of the components to be mounted on the second mounting surface 35b of the support plate 35.

For example, referring to FIGS. 3 to 6, the plurality of recesses 21c, 22c, 23c, and 24c may be arranged in a diagonal direction from the center of the corresponding channel plates 21, 22, 23, and 24 toward vertices thereof.

Figure 7:
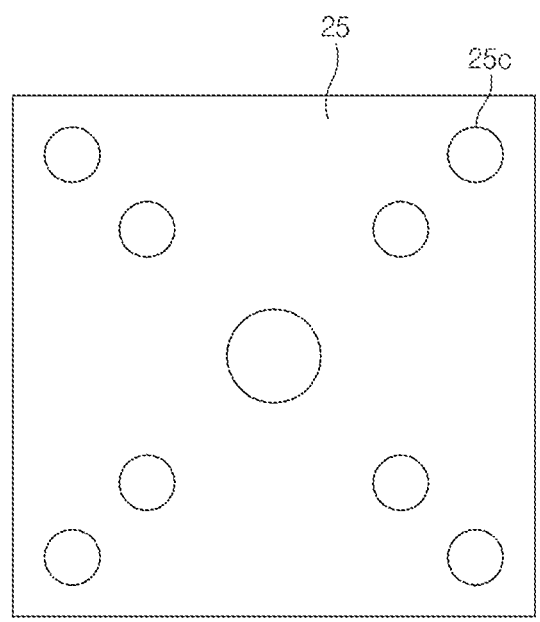
FIG. 7 illustrates a dummy plate in a plate arrangement for fluid flow according to an exemplary embodiment of the present disclosure.

Each dummy plate 25 may have a plurality of recesses 25c, and the plurality of recesses 25c may be arranged in a predetermined pattern. For example, referring to FIG. 7, the plurality of recesses 25c may be arranged in a diagonal direction from the center of the dummy plate 25 toward vertices thereof.

The plurality of recesses 25c may be aligned with at least some of the plurality of holes 35c provided in the support plate 35. Bolts 32 may be fastened to the holes 35c of the support plate 35 and the corresponding recesses 25c of the dummy plate 25 so that the dummy plate 25 may be firmly fixed to the support plate 35.

Referring to FIG. 1, various components such as a battery chiller 14, a first pump 15, a second pump 16, a first three-way valve 17, and a second three-way valve 18 may be fluidly connected to at least the portion 6a of the fluid circulation loop 6. As illustrated in FIGS. 1 and 2, the battery chiller 14, the first pump 15, the second pump 16, the first three-way valve 17, and the second three-way valve 18 may be fluidly connected to the corresponding channel plates 21, 22, and 23 through the support plate 35.

Figure 8:
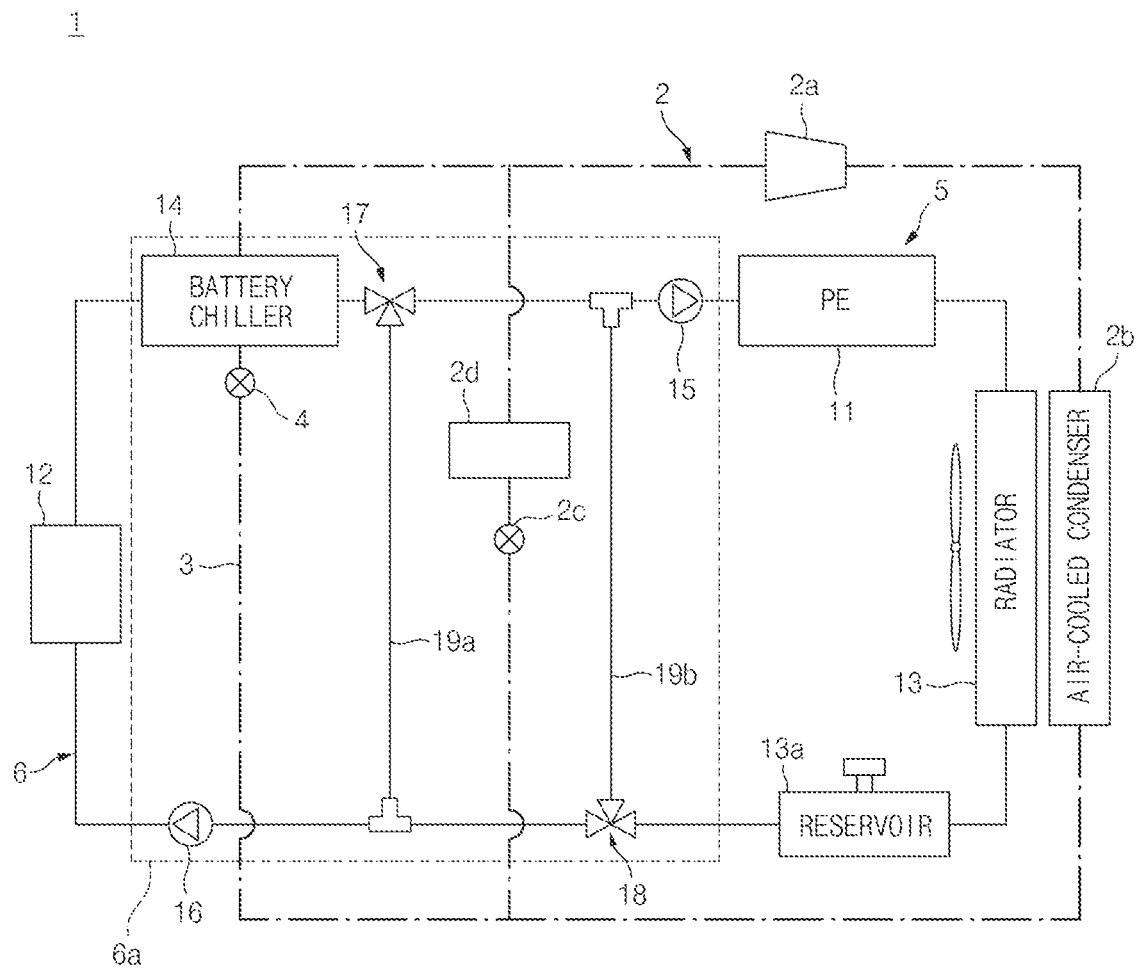
FIG. 8 illustrates a vehicle thermal management system to which a plate arrangement for fluid flow according to an exemplary embodiment of the present disclosure is applied.

FIG. 8 illustrates an example of a vehicle thermal management system 1. Referring to FIG. 8, the vehicle thermal management system 1 may include a refrigerant loop 2 of a heating, ventilation, and air conditioning (HVAC) subsystem heating or cooling air flowing into a passenger compartment of the vehicle, and a coolant system 5 thermally connected to the refrigerant loop 2.

The HVAC subsystem may be configured to heat or cool the air flowing into the passenger compartment of the vehicle using a refrigerant circulating in the refrigerant loop 2. The refrigerant loop 2 may be fluidly connected to a compressor 2a, a condenser 2b, an expansion valve 2c, and an evaporator 2d.

The compressor 2a may be configured to compress the refrigerant and circulate the refrigerant through the refrigerant loop 2. According to an exemplary embodiment, the compressor 2a may be an electric compressor which is driven by electric energy.

The condenser 2b may be configured to condense the refrigerant received from the compressor 2a. The condenser 2b may be disposed adjacent to a front grille of the vehicle, and accordingly the refrigerant may be condensed in the condenser 2b by releasing heat to the ambient air. A cooling fan may be located behind the condenser 2b. The condenser 2b may exchange heat with the ambient air forcibly blown by the cooling fan, and thus a heat transfer rate between the condenser 2b and the ambient air may be further increased.

The expansion valve 2c may be configured to expand the refrigerant received from the condenser 2b. The expansion valve 2c may be disposed between the condenser 2b and the evaporator 2d in the refrigerant loop 2. The expansion valve 2c may be located on the upstream side of the evaporator 2d, thereby adjusting the flow of the refrigerant or the flow rate of the refrigerant into the evaporator 2d. According to an exemplary embodiment, the expansion valve 2c may be a thermal expansion valve (TXV) which senses the temperature and/or pressure of the refrigerant and adjusts the opening degree thereof.

The evaporator 2d may be configured to evaporate the refrigerant received from the expansion valve 2c. That is, the refrigerant expanded by the expansion valve 2c may absorb heat from the air and be evaporated in the evaporator 25. During a cooling operation of the HVAC subsystem, the evaporator 2d may cool the air using the refrigerant cooled by condenser 2b and expanded by the expansion valve 2c, and the cooled air may be directed into the passenger compartment.

The refrigerant loop 2 may further include a branch conduit 3 branching off from an upstream point of the expansion valve 2c, and the branch conduit 3 may be fluidly connected to the compressor 2a. Accordingly, a portion of the refrigerant may be directed toward the expansion valve 2c, and a remaining portion of the refrigerant may flow through the branch conduit 3.

The coolant system 5 illustrated in FIG. 8 may be an example of a fluid flow system to which the plate arrangement 20 according to an exemplary embodiment of the present disclosure. The coolant system 5 may be configured to cool power electronics 11 and a battery pack 12 using a coolant.

Referring to FIG. 8, the coolant system 5 may include the fluid circulation loop 6 through which the coolant circulates. The fluid circulation loop 6 may be fluidly connected to the power electronics 11, the battery pack 12, a coolant radiator 13, the battery chiller 14, the first pump 15, the second pump 16, the first three-way valve 17, and the second three-way valve 18.

The power electronics 11 may include components of an electric powertrain such as an electric motor, an inverter, and an on-board charger (OBC). The power electronics 11 may have a coolant passage provided inside or outside thereof, and the coolant may pass through the coolant passage of the power electronics 11. The fluid circulation loop 6 may be fluidly connected to the coolant passage of the power electronics 11.

The coolant radiator 13 may be a high temperature radiator. The coolant radiator 13 together with the condenser 2b of the HVAC subsystem may be disposed adjacent to the front grille of the vehicle. The front grille of the vehicle may be selectively opened or closed by an active air flap. The cooling fan may be located behind the condenser 2b and the coolant radiator 13. The condenser 2b and the coolant radiator 13 may exchange heat with the ambient air forcibly blown by the cooling fan so that a heat transfer rate between the condenser 2b and the ambient air and between the coolant radiator 13 and the ambient air may be further increased.

A reservoir 13a may be located on the downstream side of the coolant radiator 13 in the fluid circulation loop 6.

The battery chiller 14 may be configured to transfer heat between the fluid circulation loop 6 and the branch conduit 3 of the refrigerant loop 2. The battery chiller 14 may be configured to cool the coolant circulating in the fluid circulation loop 6 using the refrigerant passing through the branch conduit 3 of the refrigerant loop 2.

The battery chiller 14 may include a first passage fluidly connected to the fluid circulation loop 6, and a second passage fluidly connected to the branch conduit 3 of the refrigerant loop 2. The first passage and the second passage may be adjacent to each other or contact each other in the battery chiller 14, and the first passage may be fluidly separated from the second passage. Accordingly, the battery chiller 14 may transfer heat between the coolant passing through the first passage and the refrigerant passing through the second passage.

A chiller-side expansion valve 4 may be located on the upstream side of the battery chiller 14 in the branch conduit 3, and the chiller-side expansion valve 4 may adjust the flow of the refrigerant or the flow rate of the refrigerant into the second passage of the battery chiller 14. The chiller-side expansion valve 4 may be configured to expand the refrigerant received from the condenser 2b.

According to an exemplary embodiment, the chiller-side expansion valve 4 may be an electronic expansion valve (EXV) having a drive motor. The drive motor may have a shaft which is movable to open or close an orifice defined in a valve body of the chiller-side expansion valve 4, and the position of the shaft may be varied depending on the rotation direction, rotation degree, and the like of the drive motor, and thus the opening degree of the chiller-side expansion valve 4 may be varied.

The first pump 15 may force the coolant to circulate between the power electronics 11 and the coolant radiator 13. The first pump 15 may be located between the power electronics 11 and the battery chiller 14 in the fluid circulation loop 6.

The second pump 16 may force the coolant to circulate between the battery pack 12 and the battery chiller 14. The second pump 16 may be located on the upstream side of the battery pack 12 in the fluid circulation loop 6.

The fluid circulation loop 6 of the coolant system 5 in FIG. 8 may include a first bypass conduit 19a allowing the coolant to bypass the power electronics 11 and the coolant radiator 13, and a second bypass conduit 19b allowing the coolant to bypass the battery pack 12 and the battery chiller 14.

An inlet of the first bypass conduit 19a may be connected to a point between an inlet of the first pump 15 and the battery chiller 14 in the fluid circulation loop 6, and an outlet of the first bypass conduit 19a may be connected to a point between an outlet of the reservoir 13a and an inlet of the second pump 16 in the fluid circulation loop 6.

An inlet of the second bypass conduit 19b may be connected to a point between the inlet of the first pump 15 and the battery chiller 14 in the fluid circulation loop 6, and an outlet of the second bypass conduit 19b may be connected to a point between the outlet of the reservoir 13a and the inlet of the second pump 16 in the fluid circulation loop 6. The inlet of the second bypass conduit 19b may be closer to the inlet of the first pump 15 than the inlet of the first bypass conduit 19a, and the outlet of the second bypass conduit 19b may be closer to the reservoir 13a than the outlet of the first bypass conduit 19a.

The first three-way valve 17 may be disposed at the inlet of the first bypass conduit 19a. A portion of the coolant may pass through the first bypass conduit 19a to bypass the power electronics 11 and the coolant radiator 13 by the operation of the first three-way valve 17, and thus it may sequentially pass through the battery pack 12 and the battery chiller 14. According to an exemplary embodiment, the first three-way valve 17 may include a first port fluidly connected to the battery chiller 14, a second port fluidly connected to the power electronics 11, and a third port fluidly connected to the first bypass conduit 19a. The first three-way valve 17 may be configured to perform a switching operation by a drive motor so as to allow the second port and the third port to selectively communicate with the first port. Specifically, when the first three-way valve 17 is switched to allow the second port to communicate with the first port, the third port may be closed, and accordingly the coolant may not be directed toward the first bypass conduit 19a. When the first three-way valve 17 is switched to allow the third port to communicate with the first port, the second port may be closed, and accordingly the coolant may be directed toward the first bypass conduit 19a.

The second three-way valve 18 may be disposed at the outlet of the second bypass conduit 19b. A remaining portion of the coolant may pass through the second bypass conduit 19b to bypass the battery pack 12 and the battery chiller 14 by the operation of the second three-way valve 18, and thus it may sequentially pass through the power electronics 11 and the coolant radiator 13. According to an exemplary embodiment, the second three-way valve 18 may include a first port fluidly connected to the coolant radiator 13, a second port fluidly connected to the battery pack 12, and a third port fluidly connected to the second bypass conduit 19b. The second three-way valve 18 may be configured to perform a switching operation by a drive motor so as to allow the second port and the third port to selectively communicate with the first port. Specifically, when the second three-way valve 18 is switched to allow the second port to communicate with the first port, the third port may be closed, and accordingly the coolant may not be directed toward the second bypass conduit 19b. When the second three-way valve 18 is switched to allow the third port to communicate with the first port, the second port may be closed, and accordingly the coolant may be directed toward the second bypass conduit 19b.

As described above, the coolant system 5 according to the exemplary embodiment illustrated in FIG. 8 may be a battery-power electronics cooling system configured to cool the power electronics 11 and the battery pack 12 using the coolant. The plate arrangement 20 according to an exemplary embodiment of the present disclosure may not only be applied to the battery-power electronics cooling system illustrated in FIG. 8 but also to various coolant systems configured to cool heat generating components. For example, the coolant system 5 may be a fluid flow system of at least one of an internal combustion engine cooling system configured to cool an internal combustion engine, a battery cooling system configured to cool a battery, and a power electronics cooling system configured to cool the power electronics.

In the plate arrangement 20 according to an exemplary embodiment of the present disclosure, the arrangement of the channel plates 21, 22, 23, and 24 may be varied to match at least some fluid flow paths of various fluid circulation loops, and the flattening of the channel plates with respect to the fluid circulation loops of various fluid flow systems may be effectively achieved.

The plurality of components fluidly connected to the fluid circulation loop 6 of the coolant system 5 may include control components which control the flow of the coolant, heat exchangers which cool the coolant by an external heat transfer medium, and heat generating components which generate heat and have an internal passage through which the coolant passes.

The control components may include a pump, a valve, and the like that controls the flow of the coolant, such as the first pump 15, the second pump 16, the first three-way valve 17, and the second three-way valve 18. The heat exchangers may include a radiator, a battery chiller, and the like that cools the coolant using the external heat transfer medium (the air, the refrigerant, etc.), such as the coolant radiator 13 and the battery chiller 14. The heat generating components may include components that reject heat according to the driving of the vehicle, such as the power electronics 11 and the battery pack 12. In addition, the heat generating components may also include an internal combustion engine (a prime mover of a mechanical powertrain), and various coolers (an oil cooler, a transmission cooler, an ERG cooler, etc.).

Referring to FIG. 11, the first pump 15 may be fluidly connected to the first fluid channel 21a of the corresponding first channel plate 21 through the support plate 35. The mounting flange 15c of the first pump 15 together with the corresponding first channel plate 21 may be fixed to the support plate 35 through the bolts 31. The bolts 31 may pass through the through holes of the mounting flange 15c and the holes 35c of the support plate 35 and be screwed into the recesses 21c of the corresponding first channel plate 21 so that the first pump 15 and the corresponding first channel plate 21 may be mounted together on the support plate 35. Accordingly, the first pump 15 may be mounted on the second mounting surface 35b of the support plate 35, and the corresponding first channel plate 21 may be mounted on the first mounting surface 35a of the support plate 35. The first pump 15 may have an inlet plug 15a through which the coolant draws in and an outlet plug 15b through which the coolant is discharged. The inlet plug 15a and the outlet plug 15b may protrude from the mounting flange 15c of the first pump 15 toward the support plate 35 and the first channel plate 21. The support plate 35 may have an opening 36a through which the inlet plug 15a of the first pump 15 passes and an opening 36b through which the outlet plug 15b of the first pump 15 passes. The openings 36a and 36b of the support plate 35 may directly communicate with the first fluid channel 21a of the first channel plate 21. The inlet plug 15a of the first pump 15 may pass through the opening 36a of the support plate 35 and be sealingly fitted into one portion of the first fluid channel 21a of the first channel plate 21 so that an opening of the inlet plug 15a of the first pump 15 may communicate with one portion of the first fluid channel 21a of the first channel plate 21. The outlet plug 15b of the first pump 15 may pass through the opening 36b of the support plate 35 and be sealingly fitted into the other portion of the first fluid channel 21a of the first channel plate 21 so that an opening of the outlet plug 15b of the first pump 15 may communicate with the other portion of the first fluid channel 21a of the first channel plate 21. As the inlet plug 15a and the outlet plug 15b of the first pump 15 are individually fitted into the first fluid channel 21a of the corresponding first channel plate 21, the first fluid channel 21a of the first channel plate 21 may be fluidly separated into an inlet-side channel portion communicating with the inlet plug 15a of the first pump 15 and an outlet-side channel portion communicating with the outlet plug 15b of the first pump 15.

Figure 10:
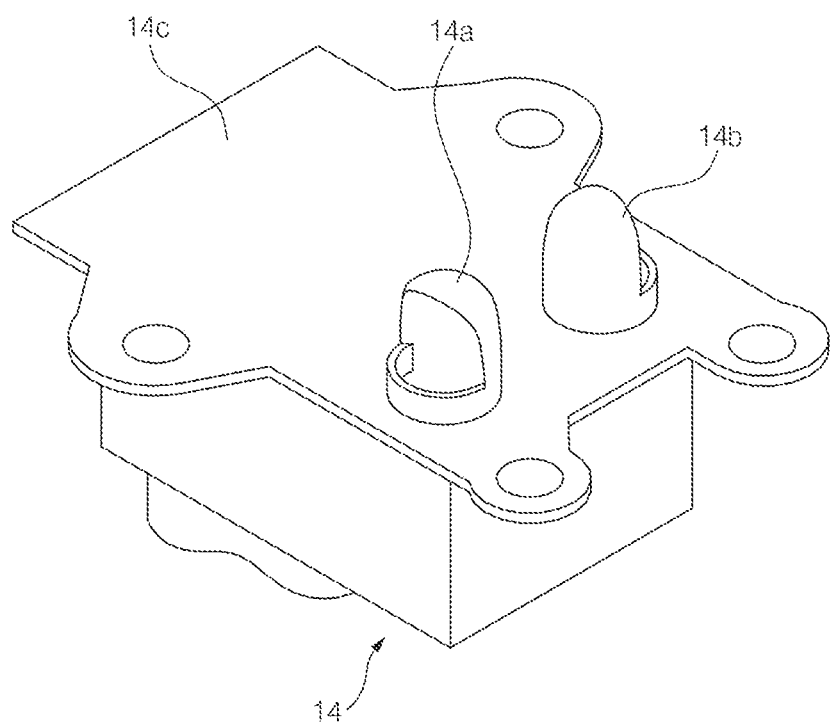
FIG. 10 illustrates a perspective view of a battery chiller connected to a plate arrangement for fluid flow according to an exemplary embodiment of the present disclosure.

Referring to FIG. 12, the battery chiller 14 may be fluidly connected to the first fluid channel 21a of the corresponding first channel plate 21 through the support plate 35. The mounting flange 14c of the battery chiller 14 may be fixed to the support plate 35 through the bolts 31. The bolts 31 may pass through the through holes of the mounting flange 14c and the holes 35c of the support plate 35 and be screwed into the recesses 21c of the corresponding first channel plate 21 so that the battery chiller 14 and the corresponding first channel plate 21 may be mounted together on the support plate 35. Accordingly, the battery chiller 14 may be mounted on the second mounting surface 35b of the support plate 35, and the corresponding first channel plate 21 may be mounted on the first mounting surface 35a of the support plate 35. Referring to FIGS. 10 and 12, the battery chiller 14 may have an inlet plug 14a through which the coolant draws in and an outlet plug 14b through which the coolant is discharged. The inlet plug 14a and the outlet plug 14b may protrude from the mounting flange 14c of the battery chiller 14 toward the support plate 35 and the first channel plate 21. The support plate 35 may have an opening 36c through which the inlet plug 14a of the battery chiller 14 passes and an opening 36d through which the outlet plug 14b of the battery chiller 14 passes. The openings 36c and 36d of the support plate 35 may directly communicate with the first fluid channel 21a of the first channel plate 21. The inlet plug 14a of the battery chiller 14 may pass through the opening 36c of the support plate 35 and be sealingly fitted into one portion of the first fluid channel 21a of the first channel plate 21 so that an opening of the inlet plug 14a of the battery chiller 14 may communicate with one portion of the first fluid channel 21a of the first channel plate 21. The outlet plug 14b of the battery chiller 14 may pass through the opening 36d of the support plate 35 and be sealingly fitted into the other portion of the first fluid channel 21a of the first channel plate 21 so that an opening of the outlet plug 14b of the battery chiller 14 may communicate with the other portion of the first fluid channel 21a of the first channel plate 21. As the inlet plug 14a and the outlet plug 14b of the battery chiller 14 are individually fitted into the first fluid channel 21a of the corresponding first channel plate 21, the first fluid channel 21a of the first channel plate 21 may be fluidly separated into an inlet-side channel portion communicating with the inlet plug 14a of the battery chiller 14 and an outlet-side channel portion communicating with the outlet plug 14b of the battery chiller 14.

Figure 9:
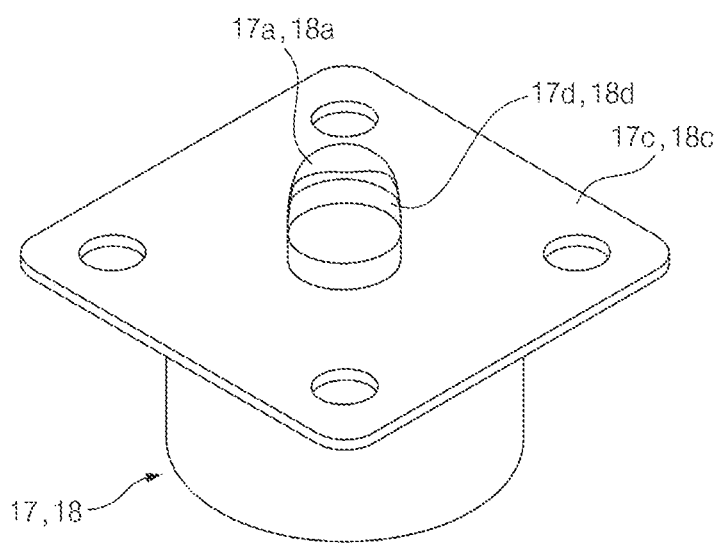
FIG. 9 illustrates a perspective view of first and second three-way valves connected to a plate arrangement for fluid flow according to an exemplary embodiment of the present disclosure.

Referring to FIG. 12, the first three-way valve 17 may be fluidly connected to the third fluid channel 23a of the corresponding third channel plate 23 through the support plate 35. The mounting flange 17c of the first three-way valve 17 may be fixed to the support plate 35 through the bolts 31. The bolts 31 may pass through the through holes of the mounting flange 17c and the holes 35c of the support plate 35 and be screwed into the recesses 23c of the corresponding third channel plate 23 so that the first three-way valve 17 and the corresponding third channel plate 23 may be mounted together on the support plate 35. Accordingly, the first three-way valve 17 may be mounted on the second mounting surface 35b of the support plate 35, and the corresponding third channel plate 23 may be mounted on the first mounting surface 35a of the support plate 35. Referring to FIGS. 9 and 12, the first three-way valve 17 may have a valve member 17a protruding from the mounting flange 17c toward the support plate 35 and the third channel plate 23. The valve member 17a of the first three-way valve 17 may be rotatably inserted into the third connection portion 23b of the third fluid channel 23a.

Figure 13:
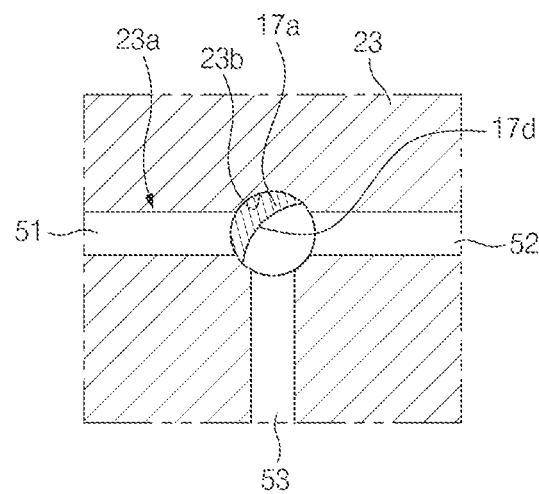
FIG. 13 illustrates a cross-sectional view, taken along line D-D of FIG. 12.

Referring to FIG. 13, the third connection portion 23b may be located at the intersection of the T-shaped third fluid channel 23a, and the valve member 17a may be rotatable in the third connection portion 23b. An outer diameter of the valve member 17a may be the same as an inner diameter of the third connection portion 23b. The valve member 17a may have a guide surface 17d guiding the flow of the coolant. The valve member 17a may be rotated by a drive motor embedded in a valve body, and accordingly the first three-way valve 17 may be switched to allow three channel portions of the T-shaped third fluid channel 23a to selectively communicate with each other by the rotation of the valve member 17a. Specifically, the third fluid channel 23a illustrated in FIG. 13 may include a first channel portion 51 fluidly connected to the battery chiller 14, a second channel portion 52 fluidly connected to the power electronics 11, and a third channel portion 53 fluidly connected to the first bypass conduit 19a. The third connection portion 23b may be located at the intersection of the first channel portion 51, the second channel portion 52, and the third channel portion 53. For example, when the first three-way valve 17 is switched to allow the second channel portion 52 to communicate with the first channel portion 51, the third channel portion 53 may be closed, and accordingly the coolant may not be directed toward the first bypass conduit 19a. When the first three-way valve 17 is switched to allow the third channel portion 53 to communicate with the first channel portion 51, the second channel portion 52 may be closed, and accordingly the coolant may be directed toward the first bypass conduit 19a.

Referring to FIG. 14, the second pump 16 may be fluidly connected to the second fluid channel 22a of the corresponding second channel plate 22 through the support plate 35. The mounting flange 16c of the second pump 16 may be fixed to the support plate 35 through the bolts 31. The bolts 31 may pass through the through holes of the mounting flange 16c and the holes 35c of the support plate 35 and be screwed into the recesses 22c of the corresponding second channel plate 22 so that the second pump 16 and the corresponding second channel plate 22 may be mounted together on the support plate 35. Accordingly, the second pump 16 may be mounted on the second mounting surface 35b of the support plate 35, and the corresponding second channel plate 22 may be mounted on the first mounting surface 35a of the support plate 35. The second pump 16 may have an inlet plug 16a through which the coolant draws in and an outlet plug 16b through which the coolant is discharged. The inlet plug 16a and the outlet plug 16b may protrude from the mounting flange 16c of the second pump 16 toward the support plate 35 and the second channel plate 22. The support plate 35 may have an opening 36e through which the inlet plug 16a of the second pump 16 passes and an opening 36f through which the outlet plug 16b of the second pump 16 passes. The openings 36e and 36f of the support plate 35 may directly communicate with the second fluid channel 22a of the second channel plate 22. The inlet plug 16a of the second pump 16 may pass through the opening 36e of the support plate 35 and be sealingly fitted into one portion of the second fluid channel 22a of the second channel plate 22 so that an opening of the inlet plug 16a of the second pump 16 may communicate with one portion of the second fluid channel 22a of the second channel plate 22. The outlet plug 16b of the second pump 16 may pass through the opening 36f of the support plate 35 and be sealingly fitted into the other portion of the second fluid channel 22a of the second channel plate 22 so that an opening of the outlet plug 16b of the second pump 16 may communicate with the other portion of the second fluid channel 22a of the second channel plate 22. As the inlet plug 16a and the outlet plug 16b of the second pump 16 are individually fitted into the second fluid channel 22a of the corresponding second channel plate 22, the second fluid channel 22a of the second channel plate 22 may be fluidly separated into an inlet-side channel portion communicating with the inlet plug 16a of the second pump 16 and an outlet-side channel portion communicating with the outlet plug 16b of the second pump 16.

Referring to FIG. 15, the mounting flange 18c of the second three-way valve 18 may be fixed to the support plate 35 through the bolts 31. The bolts 31 may pass through the through holes of the mounting flange 18c and the holes 35c of the support plate 35 and be screwed into the recesses 23c of the corresponding third channel plate 23 so that the second three-way valve 18 and the corresponding third channel plate 23 may be mounted together on the support plate 35. Accordingly, the second three-way valve 18 may be mounted on the second mounting surface 35b of the support plate 35, and the corresponding third channel plate 23 may be mounted on the first mounting surface 35a of the support plate 35. Referring to FIGS. 9 and 15, the second three-way valve 18 may have a valve member 18a protruding from the mounting flange 18c toward the support plate 35 and the third channel plate 23. The valve member 18a of the second three-way valve 18 may be rotatably inserted into the third connection portion 23b of the third fluid channel 23a.

Figure 16:
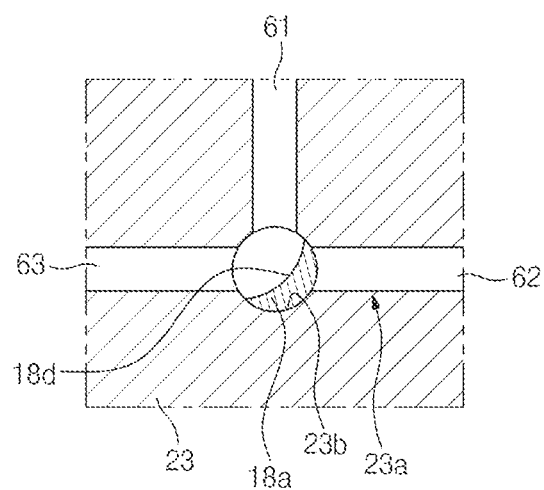
FIG. 16 illustrates a cross-sectional view, taken along line G-G of FIG. 15.

Referring to FIG. 16, the third connection portion 23b may be located at the intersection of the T-shaped third fluid channel 23a, and the valve member 18a may be rotatable in the third connection portion 23b. An outer diameter of the valve member 18a may be the same as an inner diameter of the third connection portion 23b. The valve member 18a may have a guide surface 18d guiding the flow of the coolant. The valve member 18a may be rotated by a drive motor embedded in a valve body, and accordingly the second three-way valve 18 may be switched to allow three channel portions of the T-shaped third fluid channel 23a to selectively communicate with each other by the rotation of the valve member 18a. Specifically, the third fluid channel 23a illustrated in FIG. 16 may include a first channel portion 61 fluidly connected to the coolant radiator 13, a second channel portion 62 fluidly connected to the battery pack 12, and a third channel portion 63 fluidly connected to the second bypass conduit 19b. For example, when the second three-way valve 18 is switched to allow the second channel portion 62 to communicate with the first channel portion 61, the third channel portion 63 may be closed, and accordingly the coolant may not be directed toward the second bypass conduit 19b. When the second three-way valve 18 is switched to allow the third channel portion 63 to communicate with the first channel portion 61, the second channel portion 62 may be closed, and accordingly the coolant may be directed toward the second bypass conduit 19b.

Referring to FIG. 17, some first channel plates 21 having the first fluid channels 21a which are not fluidly connected to the components may be mounted on the first mounting surface 35a of the support plate 35 through the bolts 33. The bolts 33 may pass through the holes 35c of the support plate 35 and be screwed into the recesses 21c of the corresponding first channel plate 21 so that the corresponding first channel plate 21 may be mounted on the support plate 35. The dummy plates 25 may be mounted on the first mounting surface 35a of the support plate 35 through the bolts 32. The bolts 32 may pass through the holes 35c of the support plate 35 and be screwed into the recesses 25c of the corresponding dummy plate 25 so that the corresponding dummy plate 25 may be mounted on the support plate 35.

As set forth above, the plate arrangement for fluid flow according to exemplary embodiments of the present disclosure may allow at least a portion of the fluid circulation loop to be flattened, thereby easily achieving the modularization or standardization of at least a portion of the fluid circulation loop and/or the plurality of components fluidly connected thereto. Thus, the layout of the fluid flow system may become compact and simplified, and may flexibly respond to the automated production of vehicles, thereby reducing the manufacturing costs of vehicles.

According to exemplary embodiments of the present disclosure, the channel plates may have a simple structure for fluid flow using the fluid channels and the connection portions, thereby enabling the standardization of the plate arrangement, and various components may be simply and easily mounted on at least some of the channel plates.

In particular, the arrangement of the channel plates may be varied to match at least some fluid flow paths of various fluid circulation loops, and thus the flattening of the channel plates with respect to the fluid circulation loops in the plate arrangement for fluid flow may be effectively achieved.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

The invention claimed is:

1. A plate arrangement for fluid flow, the plate arrangement comprising:
   a support plate;
   a plurality of channel plates detachably mounted on the support plate;
   a plurality of dummy plates positioned between at least some adjacent channel plates of the plurality of channel plates, wherein each dummy plate has no fluid channel; and
   a plurality of components fluidly connected to fluid channels of the plurality of channel plates, the plurality of components including at least a battery chiller or a three-way valve;
   wherein the plurality of channel plates are mounted to cover at least a portion of the support plate;
   wherein each channel plate has a fluid channel;
   wherein the plurality of channel plates are arranged along a fluid flow path of at least a portion of a predetermined fluid circulation loop so that the plurality of channel plates form at least the portion of the fluid circulation loop;
   wherein the fluid channels of adjacent channel plates are fluidly connected to each other;
   wherein the support plate includes a first mounting surface on which the plurality of channel plates are mounted, and a second mounting surface opposing the first mounting surface;
   wherein the plurality of components are mounted on the second mounting surface of the support plate;
   wherein the channel plate includes a first surface facing the support plate and a second surface opposing the first surface;
   wherein the dummy plate is a cube having a first surface facing the support plate and a second surface opposing the first surface; and
   wherein the first surface of the channel plate is flush with the first surface of the dummy plate, and the second surface of the channel plate is flush with the second surface of the dummy plate.

2. The plate arrangement according to claim 1, wherein the plurality of dummy plates are each detachably mounted on the support plate.

3. The plate arrangement according to claim 1, wherein the fluid channel is recessed from the first surface of the channel plate toward the second surface of the channel plate.

4. The plate arrangement according to claim 1, wherein the support plate has a plurality of holes arranged in a predetermined pattern, the channel plate has a plurality of recesses arranged in a predetermined pattern, and the plurality of recesses are aligned with at least some of the plurality of holes.

5. The plate arrangement according to claim 4, wherein each dummy plate has a plurality of recesses arranged in a predetermined pattern, and the plurality of recesses are aligned with at least some of the plurality of holes.

6. The plate arrangement according to claim 1, wherein each of the plurality of channel plates has the same external shape and the same external size.

7. The plate arrangement according to claim 1, wherein each of the plurality of dummy plates has the same external shape and the same external size, and wherein each dummy plate and each channel plate have the same external shape and the same external size.

8. The plate arrangement according to claim 1, wherein the first mounting surface is a flat surface corresponding to each channel plate.

9. The plate arrangement according to claim 1, wherein the plurality of components include:
   at least one control component configured to control the flow of a coolant;
   at least one heat exchanger configured to cool the coolant by an external heat transfer medium; and
   at least one heat generating component having an internal passage through which the coolant passes.

* * * * *